(12) United States Patent
Lebrun et al.

(10) Patent No.: US 6,807,875 B2
(45) Date of Patent: Oct. 26, 2004

(54) SELF-COMPENSATING POSITION SENSOR

(75) Inventors: Ivan P. Lebrun, Granger, IN (US); David H. Ohnesorge, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 150 days.

(21) Appl. No.: 09/727,737

(22) Filed: Dec. 1, 2000

(65) Prior Publication Data

US 2002/0066312 A1 Jun. 6, 2002

(51) Int. Cl.$^7$ ......................... F16K 37/00; G01M 19/00; G01B 7/00
(52) U.S. Cl. ......................... 73/865.9; 137/554; 73/168
(58) Field of Search ................................ 73/865.9, 168, 73/866.1; 137/553–554, 556; 116/277; 324/706

(56) References Cited

U.S. PATENT DOCUMENTS

| | | | |
|---|---|---|---|
| 2,831,670 A | 4/1958 | Bourns et al. | |
| 3,034,345 A | 5/1962 | Mason | 73/862.623 |
| 3,084,300 A | 4/1963 | Sanchez | 338/2 |

(List continued on next page.)

FOREIGN PATENT DOCUMENTS

| | | | | |
|---|---|---|---|---|
| DE | 3612338 | * 10/1987 | | 33/832 |
| DE | 4107071 | * 9/1991 | | 33/708 |
| DE | 42 28 307 | 3/1994 | | F15B/15/28 |
| EP | 0 502 658 | 9/1992 | | G01B/7/17 |
| EP | 844459 | * 5/1998 | | G01B/7/00 |
| FR | 2 293 703 A | 7/1976 | | G01L/1/22 |
| FR | 2 365 111 A | 4/1978 | | G01L/1/22 |
| GB | 1 495 006 | 12/1977 | | G01B/7/02 |
| JP | 60-85301 | * 5/1985 | | 33/1 R |
| JP | 62-289709 | * 12/1987 | | 324/207.24 |

OTHER PUBLICATIONS

The Bonded Electrical Resistance Strain Gage, William M. Murray and William R. Miller; Oxford University Press, 1992; pp. 242–247and 337–343, month not given.
"Transducer Design" Strain., vol. 16, No. 2, Apr. 1980, pp. 76–80, XP002196908, British Society For Strain Measurement. Newcastle–Upon–Tyne., GB ISSN: 0039–2103 p. 77, left–hand col., par. 1; Fig. 1B.
Vishay Linear Displacement Sensor (printed from Vishay web site (www.vishay.com/brands/measurements_group/guide/lds/schemat/htm)Oct. 2003).

Primary Examiner—Thomas P. Noland
(74) Attorney, Agent, or Firm—Larry J. Palguta (57) ABSTRACT

A position sensor and a method for sensing a position of a moveable member includes at least first and second deflectable members arranged so as to allow the moveable member to pass therebetween and cause the at least first and second moveable members to deflect in proportion to the position of the moveable member relative to the first and second deflectable members. In one example of the present invention, the deflectable members are cantilever-mounted members extending in generally the same direction. The amount of resultant deflection is measured by any suitable means. For example, each deflectable member may have a Wheatstone bridge provided thereon acting as a strain gauge in a known manner, such that the strain detected is proportional to the amount of deflection. In a particular example of the present invention, some of the elements of a first Wheatstone bridge are provided on the first deflectable member and some are provided on the second deflectable member. Likewise, some of the elements of a second Wheatstone bridge are provide on the first deflectable member and some are provided on the second. This desirably provides matched redundancy as well as compensation for spurious lateral movement of the moveable member.

55 Claims, 4 Drawing Sheets

U.S. PATENT DOCUMENTS

| | | | |
|---|---|---|---|
| 3,160,844 A | 12/1964 | McLellan | 338/4 |
| 3,176,509 A | 4/1965 | Schmertz | |
| 3,215,568 A | 11/1965 | Pfann | 148/33 |
| 3,277,698 A | 10/1966 | Mason | 257/417 |
| 3,329,023 A | 7/1967 | Kurtz et al. | 73/754 |
| 3,478,604 A | 11/1969 | Evans | |
| 3,479,739 A | 11/1969 | Stedman | 29/620 |
| 3,492,513 A | 1/1970 | Hollander et al. | 327/516 |
| 3,518,886 A | 7/1970 | Talmo | |
| 3,572,109 A | 3/1971 | Yerman | |
| 3,602,866 A | 8/1971 | Saxi | 338/5 |
| 3,798,754 A | 3/1974 | Price et al. | 29/583 |
| 3,884,085 A | 5/1975 | Beckman et al. | |
| 4,089,217 A * | 5/1978 | Rahav et al. | 338/5 X |
| 4,212,209 A | 7/1980 | Newbold et al. | 73/721 |
| 4,216,795 A | 8/1980 | Cobb et al. | 137/554 |
| 4,311,980 A | 1/1982 | Prudenziati | 338/4 |
| 4,319,397 A | 3/1982 | Tanabe et al. | 29/589 |
| 4,506,250 A | 3/1985 | Kirby | 338/5 |
| 4,553,436 A | 11/1985 | Hansson | 338/46 |
| 4,583,297 A * | 4/1986 | Jewell | 33/533 |
| 4,619,288 A | 10/1986 | McPherson | 137/554 |
| 4,649,340 A * | 3/1987 | Zabler | 324/207.18 |
| 4,794,048 A * | 12/1988 | Oboodi et al. | 428/432 |
| 4,848,157 A | 7/1989 | Kobayashi | 338/5 X |
| 5,109,885 A | 5/1992 | Tauscher | 137/554 |
| 5,163,329 A | 11/1992 | Shimaoka et al. | 73/721 |
| 5,170,237 A | 12/1992 | Tsuda et al. | 257/419 |
| 5,178,016 A | 1/1993 | Dauenhauer et al. | 73/727 |
| 5,184,515 A | 2/1993 | Terry et al. | 73/727 |
| 5,230,252 A | 7/1993 | O'Brien et al. | 73/867.63 |
| 5,277,064 A | 1/1994 | Knigga et al. | 73/514.14 |
| 5,291,788 A | 3/1994 | Oohata et al. | 73/727 |
| 5,349,867 A | 9/1994 | Park | 73/727 |
| 5,373,749 A * | 12/1994 | Strand et al. | 73/865.3 |
| 5,456,109 A | 10/1995 | Lautzenhiser et al. | 73/514.03 |
| 5,564,470 A | 10/1996 | Denmark et al. | 137/554 |
| 5,771,926 A | 6/1998 | Medal et al. | 37/554 |
| 5,811,017 A | 9/1998 | Matsuyama | 216/11 |
| 5,932,810 A * | 8/1999 | Westermo et al. | 73/768 |
| 5,964,242 A | 10/1999 | Slocum | 137/240 |
| 5,977,752 A * | 11/1999 | Schulz | 324/207.16 X |
| 6,021,652 A | 2/2000 | Walker | 37/554 |
| 6,070,337 A * | 6/2000 | Wallrafen | 324/207.11 |
| 6,236,301 B1 * | 5/2001 | Langford et al. | 338/6 |
| 6,304,080 B1 * | 10/2001 | Reznik et al. | 324/207.25 |
| 6,308,723 B1 | 10/2001 | Louis et al. | 137/554 X |
| 2001/0035158 A1 * | 11/2001 | Lippa | 123/399 |

* cited by examiner

FIG.6

SELF-COMPENSATING POSITION SENSOR

This application is related to application Ser. No. 09/358,773, filed on Jul. 22, 1999, and now U.S. Pat. No. 6,358,723.

FIELD OF THE INVENTION

The present invention relates to a method and apparatus for measuring a position of a movable member, especially, but not only, a linear position of a movable member.

BACKGROUND OF THE RELATED ART

In fluid transfer and routing systems, valves are extensively used to control delivery and otherwise regulate fluid flow. Frequently, proper valve operation and fast and reliable recognition of valve failures are critical to fluid system reliability.

It is known in the art to detect valve failures by measuring characteristic parameters of the fluid being transported. However, such methods largely tend to be very elaborate and require complex testing and analysis methodologies to ensure accurate detection. Furthermore, implementing such failure detection methods tend to undesirably increase development costs, operational costs, system downtime, and, where relevant, retrofit costs.

It is therefore also known to detect a valve failure in accordance with sensing the position of a valve and comparing it to an expected valve position. However, conventional valve position sensors, such as limit switches and potentiometers have low reliability because of their reliance on electrical contacts which tend to wear and deteriorate relatively quickly. Comparatively reliable sensors, such as rotary variable transformers and linear variable differential transformers are expensive. Other position sensors, such as eddy current sensors, Hall effect sensors, proximity sensors, and the like can only operate in a limited temperature range.

Accordingly, a position sensor representing an improvement over the conventional art, as discussed above, is desirable. In particular, a position sensor that is simple, cost-effective to manufacture and implement, interchangeable, and able to work in a wide range of environments is desirable. A corresponding method for detecting a position of a movable member, such as a valve member, is therefore also desirable. Moreover, it is desirable to provide a dual redundant implementation to improve reliability and fault tolerance.

SUMMARY OF THE INVENTION

Therefore, the present invention is generally directed to a position sensor including at least one deflectable member, and, more preferably, at least first and second spaced apart and deflectable members. The first and second deflectable members are positioned so as to allow a movable member, such as a valve stem or the like, to move between them, so as to cause them to deflect laterally by an amount corresponding to a position of the movable member relative to the first and second deflectable members. The position sensor according to the present invention also includes a device for determining the amount that the first and second deflectable members are deflected, and to output a signal based on the determined deflection of the first and second deflectable members. The output signal, according to the present invention, is proportional to the position of the movable member. The first and second deflectable members may be, for example, correspondingly oriented cantilever-mounted members each having a fixed proximal end and a free distal end extending in generally the same direction.

The above-described position sensor is useful as, for example, a valve position sensor, where the movable member is or is associated with a valve spool or the like.

A device for determining the amount that the first and second deflectable members are deflected may include first and second Wheatstone bridges provided on the first and second deflectable members in a known manner so that the first and second Wheatstone bridges output signals corresponding to an amount by which the first and second deflectable members are deflected. In a particular example of the present invention, resistive elements of the first and second Wheatstone bridges are provided on both the first and second deflectable members.

A method for detecting a position of a movable member according to the present invention includes passing the movable member between first and second deflectable members so as to deflect the first and second deflectable members, and determining a position of the movable member according to the extent of deflection of the first and second deflectable members.

BRIEF DESCRIPTION OF THE DRAWINGS

The present invention will be even more understandable in view of the detailed written description below, taken with reference to the appended drawings, in which.

Figure 1:
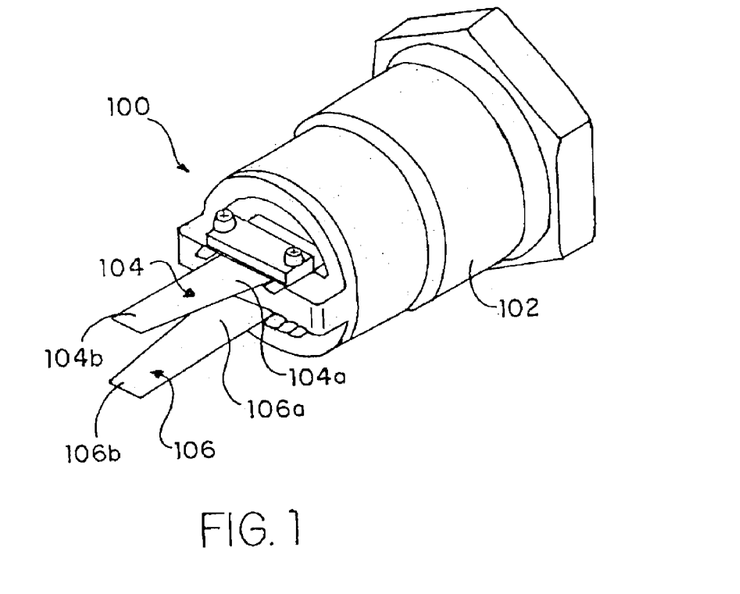
FIG. 1 is a perspective view of a position sensor according to the present invention.

DETAILED DESCRIPTION OF THE PRESENT INVENTION:

FIG. 1 illustrates a position sensor 100 according to the present invention. Position sensor 100 includes a main body 102 having, in one example of the present invention, at least a first deflectable member 104 and a second deflectable member 106 extending therefrom. The particular shape and exterior configuration of main body 102 is not critical to the present invention beyond being shaped and sized in a manner suitable for a given technical application.

First and second deflectable members 104 and 106 are, for example, cantilever-mounted with respect to main body 102 in a known manner (e.g., a screw-tightened clamp structure). That is to say, first deflectable member 104, for example, has a fixed proximal end (with respect to main body 102) 104a and a free distal end 104b. Likewise, second deflectable member 106 has a fixed proximal end 106a and a free distal end 106b. Most generally, first and second deflectable members 104 and 106 are made from relatively thin material portions that permit each to resiliently deflect from a neutral position and return. First and second deflectable members 104 and 106 may be made from, without limitation, metal, plastics, resins, etc. having mechanical characteristics (including size and thickness) that permit resilient deflection from a neutral position. The material from which first and second deflectable members 104 and 106 are made may additionally be coated with one or more coatings to alter the mechanical characteristics thereof, such as, without limitation, resistance to thermal distortion, electromagnetic properties, and durability. See, for example, U.S. Pat. No. 4,794,048 to Oboodi et al., the contents of which are incorporated herein by reference.

First and second deflectable members 104 and 106 may generally have a variety of shapes, as seen in plan view, including, without limitation, rectangular or trapezoidal. The shape of the first and second deflectable members has an effect on operation of the position, as discussed further below with reference to FIGS. 6 and 7.

Figure 2:
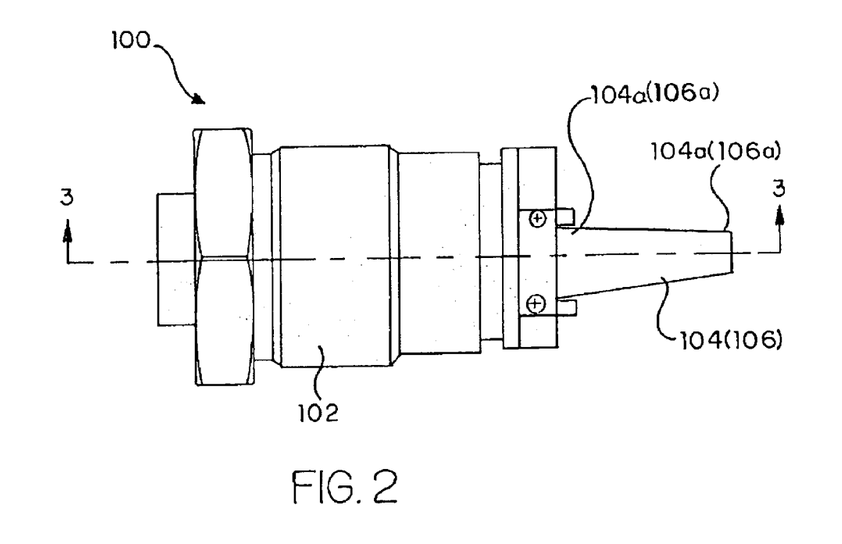
FIG. 2 is a plan view of a position sensor according to the present invention.
Figure 3:
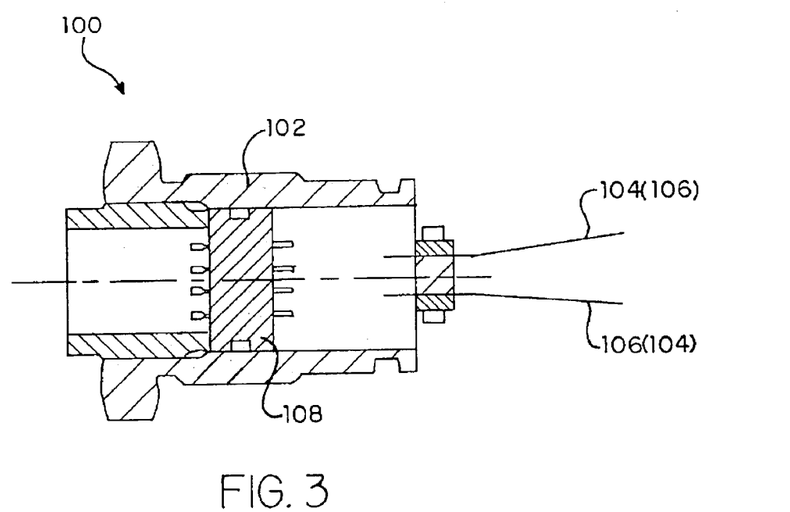
FIG. 3 is a cross-sectional view of the position sensor according to the present invention taken with respect to line 3—3 in FIG. 2.

FIG. 3 is a cross-sectional view of the position sensor 100 seen in FIG. 2, as taken along line 3—3. As seen in FIG. 3, main body 102 may contain an electronic connector or controller 108 therein. The function of connector/controller 108 is also discussed below. As seen in FIG. 3, first and second deflectable members 104 and 106 are spaced apart from each other. First and second deflectable members 104 and 106 need not be exactly parallel according to the present invention. However, distal ends 104b and 106b are preferably spaced apart from each other by a sufficient distance to permit a movable member (see, for example, FIG. 4) to move freely therebetween without one or both of distal ends 104b and 106b retarding the motion of the movable member. Another feature of the present invention is that first and second deflectable members 104 and 106 each have a neutral orientation or position to which they each return after being resiliently deflected. It is the amount that each deflectable member is deflected from their respective neutral positions that is used to sense a position of a movable member therebetween.

Figure 4:
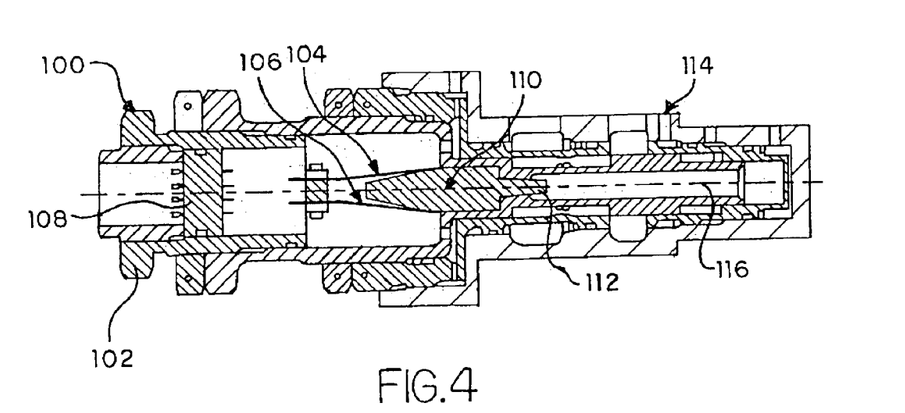
FIG. 4 illustrates a position sensor according to the present invention in situ with respect to a movable member.

FIG. 4 illustrates a position sensor 100 in situ relative to a movable member 112. Movable member 112 is, for example, linearly displaceable relative to assembly body 114 along axis 116. Movable member 112 may be tapered or otherwise rounded, as seen in FIG. 4, so as to facilitate passing the end of movable member 112 between the free distal ends 104b and 106b of first and second deflectable members 104 and 106. As seen here, solely by way of example and without being limiting, movable member 112 is conical. It could have other shapes as well, such as frusto-conical. However, such tapering or rounding is not required according to the present invention.

According to the present invention, as movable member 112 moves further in between first and second deflectable members 104 and 106, the first and second deflectable members 104 and 106 each resiliently deflect laterally outward. The amount of lateral deflection of the first and second deflectable members 104 and 106 is proportional to how far movable member 112 is moved between first and second deflectable members 104 and 106.

It will be appreciated that the lateral deflection of first and second deflectable members 104 and 106 is typically much smaller, in terms of linear distance, than the corresponding linear movement of movable member 112. Using this scaling relationship permits effective reduction of, for example, 1 inch of linear movement of movable member 112 down to, for example, 0.1 inch of lateral deflection of first and second deflectable members 104 and 106. This reduction of scale can be important depending on the manner in which the deflection of first and second deflectable members 104 and 106 is measured. In this regard, many methods of measure that can be used in accordance with the present invention cannot handle the relatively large scale motion of movable member 112 (i.e., motion on the order of inches).

It is possible to use only one deflectable member in the manner discussed above to sense a position of movable member 112 in accordance with the present invention. However, because of mechanical tolerances present in most systems, movable member 112 usually has some degree of motion in a direction transverse to its direction of motion (e.g., in a vertical direction in the plane of the drawing in FIG. 4). Therefore, using a single deflectable member in the manner discussed here could cause an inaccurate position measurement because the deflectable member may be over-deflected or under-deflected because of the spurious transverse movement of the movable member 112.

It is therefore desirable to use at least two deflectable members in the manner discussed herein. The use of at least two deflectable members permits detection of and/or compensation for spurious lateral movement of movable member 112. For example, with respect to FIG. 4, if movable member 112 is displaced laterally towards deflectable member 104 (in addition to being linearly displaced along axis 116), then first deflectable member 104 will register a larger deflection than second deflectable member 106. Appropriate measurement compensation (e.g., averaging) may then be undertaken if desired.

Figure 5A:
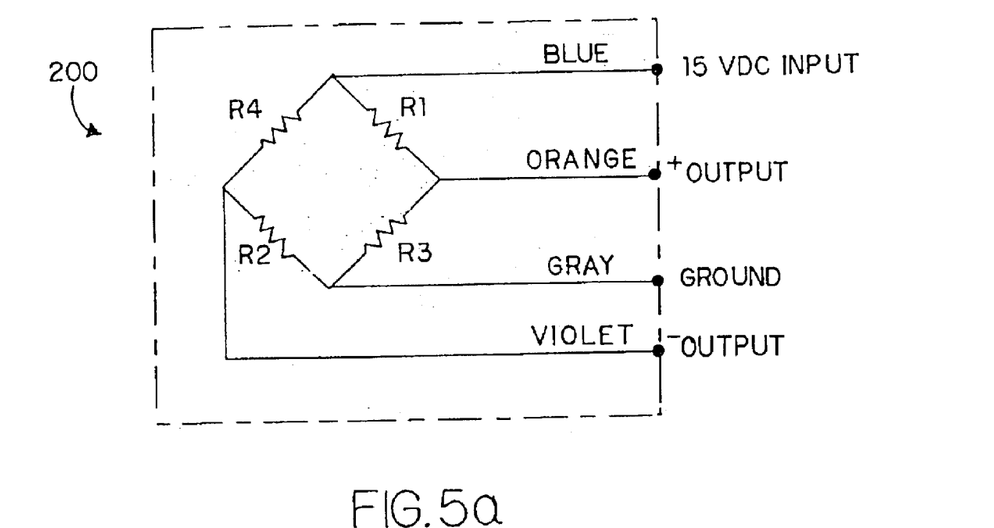
FIGS. 5a and 5b illustrate first and second Wheatstone bridges used in accordance with the present invention.
Figure 5B:
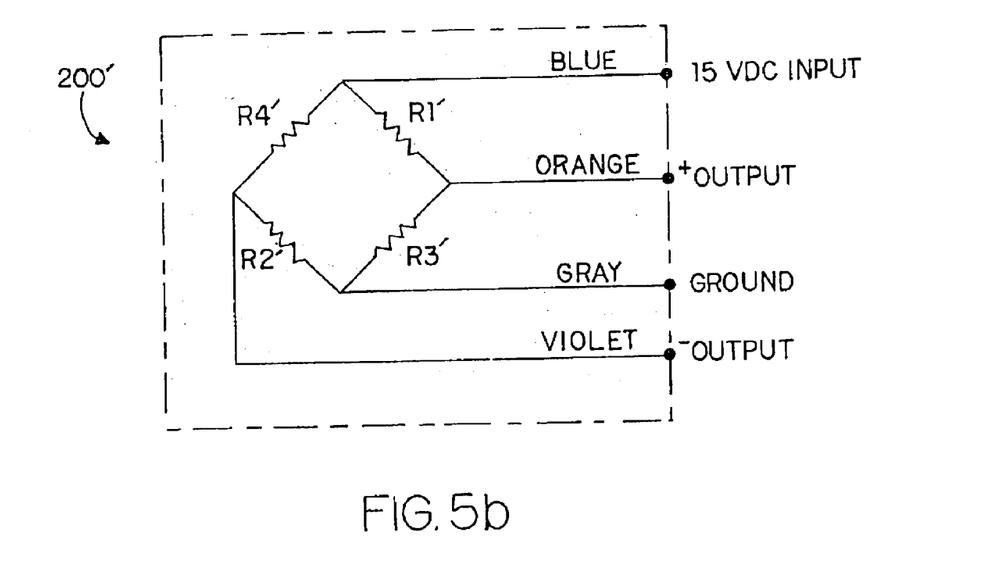

In one example of the present invention, first and second deflectable members 104 and 106 each have first and second Wheatstone bridges 200 and 200' of the type generally illustrated in FIGS. 5a and 5b provided thereon, respectively. Wheatstone bridges are well-known electrical circuits commonly used in strain gauge measurement, so a detailed explanation thereof is omitted here, except to mention that a strain applied to the Wheatstone bridge measurably alters the resistance of the Wheatstone bridge in proportion to the strain applied thereto, which in turn in proportional to the amount of deflection of the deflectable member. Electrically, the Wheatstone bridges illustrated in FIGS. 5a and 5b are identical, except the resistive elements of second Wheatstone bridge 200' are denoted with prime marks (i.e., R1', R2', R3', R4') to help distinguish them from the resistive elements of first Wheatstone bridge 200 in the discussion hereinbelow. The resistance of the resistive elements in Wheatstone bridges 200 and 200' are, for example, 8 k ohms ±1 k ohm.

In addition to the circuitry illustrated in FIGS. 5a and 5b, a temperature sensing resistor (not shown) may be connected to input of each Wheatstone bridge 200 and 200'.

The electrical leads to each Wheatstone bridge are connected to or interfaced in connector/controller 108. Connector/controller 108 may, for example, provide an electrical connection to a known device for measuring the deflection of first and second deflectable members 104 and 106 and converting it in a known method (that relates the predetermined profile of movable member 112 with the linear position of movable member 112) to output the linear position of movable member 112. In the alternative, connector/controller 108 may itself be or be provided with a known device. The device may be, for example, a microprocessor suitably programmed to convert the detected change in resistance to a deflection amount, and, in turn, to a linear position based on the shape profile of movable member 112. Each Wheatstone bridge is electrically connected with a voltage source (not shown) in accordance with the known operation of Wheatstone bridges and with FIGS. 5a and 5b.

Generally, the resistive elements of first Wheatstone bridge 200 may be provided on first deflectable member 104 and the resistive elements of the second Wheatstone bridge 200' may be provided on second deflectable members 106. Thus, the deflection of the first and second deflectable members 104 and 106 can be measured in a known manner as a function of the strain detected by first and second Wheatstone bridges 200 and 200' as first and second deflectable members 104 and 106, respectively, are deflected. In particular, this arrangement addresses the conventional problem of sensor errors caused by transverse movement of movable member 112, as discussed above.

In some applications (e.g., aerospace), a dual redundant implementation is required to improve reliability and fault tolerance. This means that redundant deflectable members must be "matched" so that the outputs track with each other with sufficient closeness so that a significant error does not occur when switching from one to the other.

Therefore, in an example of a dual redundant implementation according to the present invention, first deflectable member 104 includes resistive elements R1 and R2 of first Wheatstone bridge 200 provided on an outer side thereof, and resistive elements R1' and R2' of second Wheatstone bridge 200' provided on an inner (i.e., facing second deflectable member 106) side thereof. Likewise, second deflectable member 106 includes resistive elements R3' and R4' of second Wheatstone bridge 200' provided on an outer side thereof, and resistive elements R3 and R4 of first Wheatstone bridge 200 provided on an inner side thereof. With this arrangement, first and second deflectable members 104 and 106 together act as a position sensor, because the first Wheatstone bridge 200 has some resistive elements thereof provided on first deflectable member 104 and some provided on deflectable member 106. To provide the required redundancy, second Wheatstone bridge 200' has some resistive elements thereof provided on first deflectable member 104 and some provided on deflectable member 106. Thus, if one of the Wheatstone bridges were to fail, the other could be used instead.

Furthermore, the Wheatstone bridges are inherently matched because they both depend on the same inputs (i.e., from both the first and second deflectable members 104 and 106, taken together). In the previous example, by contrast, one Wheatstone bridge was completely provided on one deflectable member, and another Wheatstone bridge was completely provided on the other deflectable member. Therefore, the Wheatstone bridges are not matched because they operate independently.

Even if a dual redundant implementation (i.e., providing two redundant Wheatstone bridges) is not used, the idea of providing some resistive elements (e.g., R1 and R2) of one Wheatstone bridge 200 on deflectable member 104 and other resistive elements (e.g., R3 and R4) on deflectable member 106 can still be applied to provide a self compensation effect.

As mentioned above, the shape of deflectable members 104 and 106 has an effect on the operation of the position sensor. While a variety of shapes, in plan, are operable, a deflectable member having a first width adjacent to the fixed proximal end thereof, a second width, narrower than the first width, adjacent to the free distal end thereof, and a smoothly concavely decreasing width therebetween has a unique strain behavior, and is disclosed in U.S. patent application Ser. No. 09/645,674 titled "Uniform Strain Piezo-resistive Sensor," filed on Aug. 24, 2000, and now abandoned the entire contents of which is incorporated herein by reference.

Figure 6:
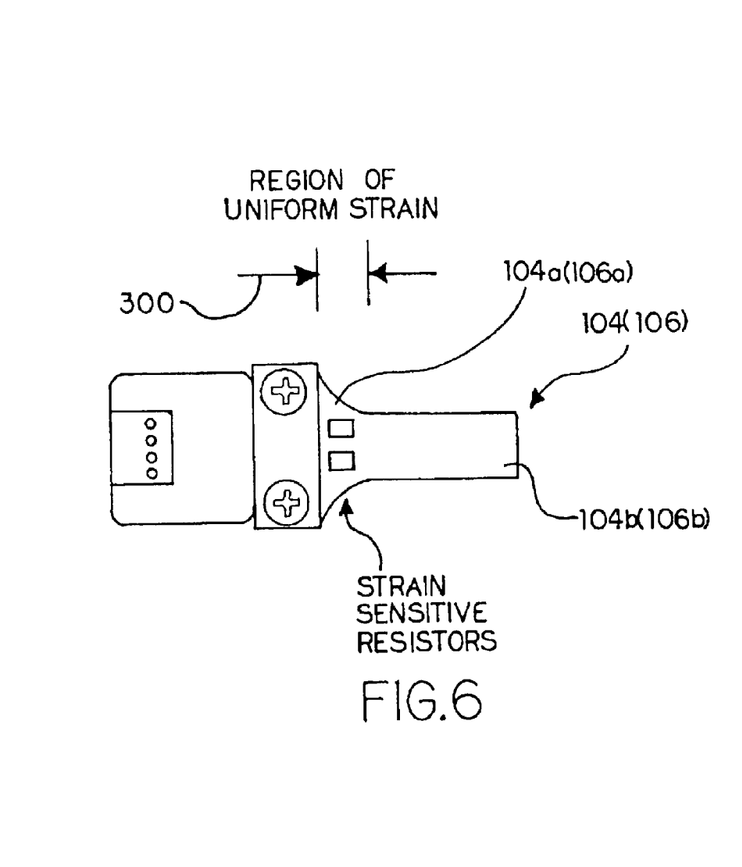
FIG. 6 is plan view of a deflectable member according to the present invention having improved operational characteristics.
Figure 7:
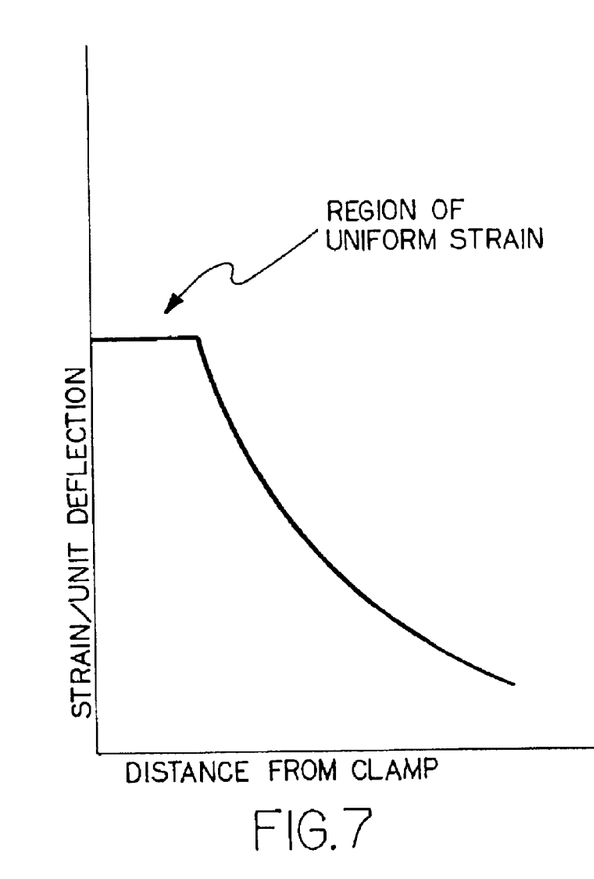
FIG. 7 illustrates a mechanical behavior of a deflectable member according to the present invention having the shape illustrated in FIG. 6.

As illustrated in FIGS. 6 and 7, the region 300 of decreasing width has a uniform strain behavior with respect to a distance from the fixed proximal end (held by a clamp or the like). That is to say, the strain per unit deflection in region 300 is independent of the distance from the fixed end. Beyond region 300, the strain per unit deflection decreases non-linearly in proportion to the distance from the fixed proximal end. This behavior is significant because it means that the resistive elements of the Wheatstone bridges used in the present invention can be placed anywhere in region 300 and still have the same strain behavior. This greatly facilitates consistent manufacture of reliable devices, because the resistive elements do not need to be so precisely placed in the same manner as respective position sensors are manufactured.

The present invention being thusly described, it will be obvious that the same may be varied in many ways. Such variations are not to be regarded as a departure from the spirit and scope of the invention, and all such modifications as would be obvious to one skilled in the art are intended to be included within the scope of the following claims. In particular, it will be readily apparent to one of ordinary skill that the present invention can be viewed more broadly in terms of relative movement, such that what has been heretofore described as a "movable" member could instead be positionally fixed in accordance with the present invention, and the deflectable member(s) could be movable relative to the now-fixed member, so as to sense the position of the assembly including the deflectable member(s).

What is claimed is:

1. A sensor for sensing the position a movable member, comprising:

first and second spaced apart and deflectable members, the movable member being movable between said first and second deflectable members so that said first and second deflectable members are laterally deflectable by the movable member in correspondence with a movement of the movable member, such that said first and second deflectable members deflect in opposite lateral directions and an amount of lateral deflection by both deflectable members increases the further the movable member is moved in between the first and second deflectable members, said first and second deflectable members each being arranged to create a deflection-dependent effect based on movement of the movable member; and a deflection determining device constructed and arranged to generate a signal based on the deflection-dependent effects created by deflection of said first and second deflectable members, said signal being proportional to a position of the movable member, such that a combination of the deflection-dependent effect created by deflection of said first deflectable member and the deflection-dependent effect created by deflection of said second deflectable member indicates position of said movable member.

2. The sensor according to claim 1, wherein said deflection determining device comprises first and second piezo-resistive Wheatstone bridges, said first and second Wheatstone bridges each including electrically resistive elements, some of said resistive elements of said first Wheatstone bridge and some of said resistive elements of said second Wheatstone bridge being provided on said first deflectable member, and some of said resistive elements of said first Wheatstone bridge and some of said resistive elements of said second Wheatstone bridge being provided on said second deflectable member.

3. The sensor according to claim 2, wherein said first and second Wheatstone bridges each include first, second, third, and fourth resistive elements, wherein:

said first and second resistive elements of said first Wheatstone bridge are provided on a side of said first deflectable member facing the movable member;

said third and fourth resistive elements of said first Wheatstone bridge are provided on a side of said second deflectable member facing away from the movable member;

said first and second resistive elements of said second Wheatstone bridge are provided on a side of said first deflectable member facing away from the movable member; and said third and fourth resistive elements of said second Wheatstone bridge are provide on a side of said second deflectable member facing the movable member.

4. The sensor according to claim 3, wherein said first and second Wheatstone bridges each include:

a voltage input electrically between said first and fourth resistive elements;

a ground electrically between said second and third resistive elements;

a first output electrically between said first and third resistive elements; and a second output electrically between said second and fourth resistive elements.

5. The sensor according to claim 4, said deflection determining device comprising temperature-sensitive fifth resistive elements connected to said voltage input of said first Wheatstone bridge and to said voltage input of said second Wheatstone bridge, respectively.

6. The sensor according to claim 4, wherein at least one of said first, second, third, and fourth resistive elements of said first and second Wheatstone bridges has a resistance of 8 k ohms.

7. The sensor according to claim 4, the deflection determining device comprising a resistive temperature detector.

8. The sensor according to claim 1, wherein said deflection determining device comprises a converting mechanism constructed and arranged to convert said signal proportional to a position of the movable member into a position value.

9. The sensor according to claim 1, wherein said first and second deflectable members extend on either side of an axis, the movable member being movable along the same axis.

10. The sensor according to claim 1, wherein said deflection determining device comprises a single piezo-resistive Wheatstone bridge comprising resistive elements, some of which are provided on said first deflectable member and some of which are provided on said second deflectable member.

11. The sensor according to claim 1, wherein said deflection determining device comprises first and second piezo-resistive Wheatstone bridges each including first and second pluralities of resistive elements, respectively, wherein said first plurality of resistive elements is provided on said first deflectable member and second plurality of resistive elements is provided on said second deflectable member.

12. A sensor for sensing the position of a movable member, comprising:

first and second spaced apart and deflectable members, the movable member being movable between said first and second deflectable members so that said first and second deflectable members are deflectable by the movable member in correspondence with a movement of the movable member, said first and second deflectable members each being arranged to create a deflection-dependent effect based on movement of the movable member; and a deflection determining device constructed and arranged to generate a signal based on the deflection-dependent effects created by deflection of said first and second deflectable members, said signal being proportional to a position of the movable member, such that a combination of the deflection-dependent effect created by deflection of said first deflectable member and the deflection-dependent effect created by deflection of said second deflectable member indicates position of said movable member, wherein said first and second deflectable members are cantilever-mounted members, each having a fixed proximal end and a free distal end.

13. The sensor according to claim 12, wherein at least one of said first and second deflectable members has a first width at said proximal end, a second width narrower than said first width at said distal end, and an intermediate region having a width concavely decreasing from said first width to said second width located between said proximal end and said distal end.

14. The sensor according to claim 13, wherein said intermediate width has a continuously decreasing width.

15. The sensor according to claim 13, wherein said intermediate region has a stepwise decreasing width.

16. The sensor according to claim 13, wherein said first and second deflectable members each have a first width at said proximal end, a second width narrower than said first width at said distal end, and an intermediate region having a width decreasing from said first width to said second width located between said proximal end and said distal end.

17. The sensor according to claim 16, wherein said intermediate width has a continuously decreasing width.

18. The sensor according to claim 16, wherein said intermediate region has a stepwise decreasing width.

19. The sensor according to claim 13, wherein at least one of said first and second deflectable members comprises a metal substrate having a ceramic coating.

20. The sensor according to claim 13, wherein said deflection determining device comprises first and second piezo-resistive Wheatstone bridges each including first, second, third, and fourth resistive elements, wherein:

said first and second resistive elements of said first Wheatstone bridge are provided on a side of said first deflectable member facing the movable member in said intermediate region;

said third and fourth resistive elements of said first Wheatstone bridge are provided on a side of said second deflectable member facing away from the movable member in said intermediate region;

said first and second resistive elements of said second Wheatstone bridge are provided on a side of said first deflectable member facing away from the movable member in said intermediate region; and said third and fourth resistive elements of said second Wheatstone bridge are provide on a side of said second deflectable member facing the movable member in said intermediate region.

21. A sensor for sensing the position of a movable member, comprising:

first and second spaced apart and deflectable members, the movable member being movable between said first and second deflectable members so that said first and second deflectable members are deflectable by the movable member in correspondence with a movement of the movable member, said first and second deflectable members each being arranged to create a deflection-dependent effect based on movement of the movable member; and a deflection determining device constructed and arranged to generate a signal based on the deflection-dependent effects created by deflection of said first and second deflectable members, said signal being proportional to a position of the movable member, such that a combination of the deflection-dependent effect created by deflection of said first deflectable member and the deflection-dependent effect created by deflection of said second deflectable member indicates position of said movable member, wherein the movable member is connected to a valve, such that a position of the movable member corresponds to a position of the valve.

22. A valve position sensor comprising:

a linearly movable member associated with a valve spool;

first and second deflectable members mounted offset from a line along which said movable member moves, said movable member being movable between said first and second deflectable members so that said first and second deflectable members are laterally deflected in opposite lateral directions in correspondence with a movement of said movable member, such that an amount of lateral deflection by both deflectable members increases the further the movable member is moved in between said first and second deflectable members;

a deflection determining device constructed and arranged to output a signal based on a deflection of said first and second deflectable members, said signal being proportional to a position of the movable member and said valve spool.

23. The sensor according to claim 22, wherein said deflection determining device comprises first and second piezo-resistive Wheatstone bridges, said first and second Wheatstone bridges each including electrically resistive elements, some of said resistive elements of said first Wheatstone bridge and some of said resistive elements of said second Wheatstone bridge being provided on said first deflectable member, and some of said resistive elements of said first Wheatstone bridge and some of said resistive elements of said second Wheatstone bridge being provided on said second deflectable member.

24. The sensor according to claim 23, wherein said first and second Wheatstone bridges each include first, second, third, and fourth resistive elements, wherein:

said first and second resistive elements of said first Wheatstone bridge are provided on a side of said first deflectable member facing the movable member;

said third and fourth resistive elements of said first Wheatstone bridge are provided on a side of said second deflectable member facing away from the movable member;

said first and second resistive elements of said second Wheatstone bridge are provided on a side of said first deflectable member facing away from the movable member; and said third and fourth resistive elements of said second Wheatstone bridge are provide on a side of said second deflectable member facing the movable member.

25. The sensor according to claim 23, wherein said first and second Wheatstone bridges each include:

a voltage input electrically between said first and fourth resistive elements;

a ground electrically between said second and third resistive elements;

a first output electrically between said first and third resistive elements; and a second output electrically between said second and fourth resistive elements.

26. The sensor according to claim 25, said deflection determining device comprising temperature-sensitive fifth resistive elements connected to said voltage input of said first Wheatstone bridge and to said voltage input of said second Wheatstone bridge, respectively.

27. The sensor according to claim 25, wherein at least one of said first, second, third, and fourth resistive elements of said first and second Wheatstone bridges has a resistance of 8 k ohms.

28. The sensor according to claim 25, the deflection determining device comprising a resistive temperature detector.

29. The sensor according to claim 22, wherein said deflection determining device comprises a converting mechanism constructed and arranged to convert said signal proportional to a position of the movable member into a position value.

30. The sensor according to claim 22, wherein the movable member is connected to a valve, such that a position of the movable member corresponds to a position of the valve.

31. The sensor according to claim 22, wherein said first and second deflectable members extend on either side of an axis, the movable member being movable along the same axis.

32. The sensor according to claim 22, wherein said movable member is part of the valve spool.

33. The sensor according to claim 22, wherein said movable member is tapered.

34. The sensor according to claim 33, wherein said movable member is conical.

35. The sensor according to claim 22, wherein said deflection determining device comprises a single piezo-resistive Wheatstone bridge comprising resistive elements, some of which are provided on said first deflectable member and some of which are provided on said second deflectable member.

36. The sensor according to claim 22, wherein said deflection determining device comprises first and second piezo-resistive Wheatstone bridges each including first and second pluralities of resistive elements, respectively, wherein said first plurality of resistive elements is provided on said first deflectable member and second plurality of resistive elements is provided on said second deflectable member.

37. A valve position sensor comprising:

a linearly movable member associated with a valve spool;

first and second deflectable members mounted offset from a line along which said movable member moves, said movable member being movable between said first and second deflectable members so as to be deflected in correspondence with a movement of said movable member;

a deflection determining device constructed and arranged to output a signal based on a deflection of said first and second deflectable members, said signal being proportional to a position of the movable member and said valve spool, wherein said first and second deflectable members are cantilever-mounted members, each having a fixed proximal end and a free distal end.

38. The sensor according to claim 37, wherein at least one of said first and second deflectable members has a first width at said proximal end, a second width narrower than said first width at said distal end, and an intermediate region having a width decreasing from said first width to said second width located between said proximal end and said distal end.

39. The sensor according to claim 38, wherein said intermediate width has a continuously decreasing width.

40. The sensor according to claim 38, wherein said intermediate region has a stepwise decreasing width.

41. The sensor according to claim 38, wherein said first and second deflectable members each have a first width at said proximal end, a second width narrower than said first width at said distal end, and an intermediate region having a width decreasing from said first width to said second width located between said proximal end and said distal end.

42. The sensor according to claim 41, wherein said intermediate width has a continuously decreasing width.

43. The sensor according to claim 41, wherein said intermediate region has a stepwise decreasing width.

44. The sensor according to claim 41, wherein said deflection determining device comprises first and second piezo-resistive Wheatstone bridges each including first, second, third, and fourth resistive elements, wherein:

said first and second resistive elements of said first Wheatstone bridge are provided on a side of said first deflectable member facing the movable member in said intermediate region;

said third and fourth resistive elements of said first Wheatstone bridge are provided on a side of said second deflectable member facing away from the movable member in said intermediate region;

said first and second resistive elements of said second Wheatstone bridge are provided on a side of said first deflectable member facing away from the movable member in said intermediate region; and said third and fourth resistive elements of said second Wheatstone bridge are provide on a side of said second deflectable member facing the movable member in said intermediate region.

45. The sensor according to claim 38, wherein at least one of said first and second deflectable members comprises a metal substrate having a ceramic coating.

46. A method for detecting a position of a movable member, comprising:

passing the movable member between first and second deflectable members so as to laterally deflect the first and second deflectable members, such that said first and second deflection members deflect in opposite lateral directions and an amount of lateral deflection by both the first and second deflectable members increases the further the movable member passes in between the deflectable members, thereby creating a deflection-dependent effect for each of the first and second deflectable members; and determining a position of the movable member according to a combination of the deflection-dependent effect for the first deflectable member and the deflection-dependent effect for the second deflectable member.

47. The method according to claim 46, wherein determining a position of the movable member comprises:

providing first and second resistive elements of a first Wheatstone bridge on a side of the first deflectable member facing the movable member;

providing third and fourth resistive elements of the first Wheatstone bridge on a side of the second deflectable member facing away from the movable member;

providing first and second resistive elements of a second Wheatstone bridge on a side of the first deflectable member facing away from the movable member;

providing third and fourth resistive elements of the second Wheatstone bridge are provide on a side of the second deflectable member facing the movable member; and determining a deflection of the first and second deflectable members using signals generated by the first and second Wheatstone bridges; and determining a position of the movable member based on the detected deflection of the first and second deflectable members.

48. The method according to claim 46, wherein the first and second deflectable members comprise a metal substrate having a ceramic coating.

49. A method for detecting a position of a movable member, comprising:

passing the movable member between first and second deflectable members so as to deflect the first and second deflectable members, thereby creating a deflection-dependent effect for each of the first and second deflectable members; and determining a position of the movable member according to a combination of the deflection-dependent effect for the first deflectable member and the deflection-dependent effect for the second deflectable member, wherein the first and second deflectable members are cantilever-mounted members, each having a fixed proximal end and a free distal end.

50. The method according to claim 49, wherein each of the first and second deflectable members has a first width at the proximal end, a second width narrower than the first width at the distal end, and an intermediate region having a width decreasing from the first width to the second width located between the proximal end and the distal end.

51. The method according to claim 50, wherein the intermediate width has a continuously decreasing width.

52. The method according to claim 50, wherein the intermediate region has a stepwise decreasing width.

53. The method according to claim 50, wherein the first and second deflectable members each have a first width at the proximal end, a second width narrower than the first width at the distal end, and an intermediate region having a width decreasing from the first width to the second width located between the proximal end and the distal end.

54. The method according to claim 50, wherein determining a position of the movable member comprises:

providing first and second resistive elements of a first Wheatstone bridge on a side of the first deflectable member facing the movable member in the intermediate region;

providing third and fourth resistive elements of the first Wheatstone bridge on a side of the second deflectable member facing away from the movable member in the intermediate region;

providing first and second resistive elements of a second Wheatstone bridge on a side of the first deflectable member facing away from the movable member in the intermediate region;

providing third and fourth resistive elements of the second Wheatstone bridge are provide on a side of the second deflectable member facing the movable member in the intermediate region; and determining a deflection of the first and second deflectable members using signals generated by the first and second Wheatstone bridges; and determining a position of the movable member based on the detected deflection of the first and second deflectable members.

55. A position sensor comprising:

a movable assembly including first and second spaced apart and deflectable members;

a fixed member disposed between said first and second deflectable members, said first and second deflectable members being deflectable by the fixed member in correspondence with a movement of the movable assembly relative to the fixed member, said first and second deflectable members each being arranged to create a deflection-dependent effect based on movement of the movable assembly relative to the fixed member; and a deflection determining device constructed and arranged to output a signal based on a deflection of said first and second deflectable members, said signal being proportional to a position of the movable assembly such that a combination of the deflection-dependent effect created by deflection of said first deflectable member and the deflection-dependent effect created by deflection of said second deflectable member indicates position of the movable assembly relative to the fixed member, wherein said first and second deflectable members are cantilever-mounted members, each having a fixed proximal end and a free distal end.

* * * * *